UNITED STATES PATENT OFFICE 2,190,183

STABLE SUSPENSION OF HORMONE PREPARATIONS

Hermann Friedrich, Wuppertal-Elberfeld, Germany, assignor to Winthrop Chemical Company, Inc., New York, N. Y., a corporation of New York No Drawing. Application December 16, 1937, Serial No. 180,159. In Germany December 19, 1936

8 Claims. (Cl. 167—74)

The present invention relates to stable and homogeneous suspensions of preparations of the hormone of the anterior lobe of the hypothysis and to a process of preparing the same. Suspensions or solutions of hormones, as for example of "insulin" or of the sexual hormones of lipoid character, in oils or unsaponifiable lipoids, have already been prepared. The suspensions prepared from the gonadotropic hormone of the anterior lobe of the hypophysis in olive oil, however, have the disadvantage that they separate in a short time and become unhomogeneous whereby their practical use is impaired.

In accordance with the present invention stable and homogeneous suspensions of preparations of the hormone of the anterior lobe of the hypophysis can be obtained by preparing the suspensions of the hormone in physiologically innocuous oils with the addition of anhydrous wool fat.

The reasons for the stability of the suspensions thus obtained are not exactly known. It has been assumed that one reason consists in assimilating the specific weight of the preparation of the hormone to that of the applied vegetable or animal oil (about 0.91). This assumption is in some way sustained by the fact that the use of a preparation of the hormone having been purified by removing the salt, for example by means of dialysis or by effecting the separation of the salt by adsorption or precipitation of the hormone in the usual manner, is especially advantageous. Such purified preparations have only a specific weight of about 1.4 whilst in contradistinction thereto impurified hormone preparations show a specific weight of about 2.1.

A solution of wool fat in vegetable or animal oil shows a viscosity being 1.5 times higher that that of the same without wool fat. This fact could be further assumed to be a reason for the stability of my suspensions. Consequently those oils which have a viscosity being especially high would be likewise or more efficacious than a mixture of a vegetable oil and wool fat. Such oils are, for instance, paraffin-oil and castor-oil. In order to prove this supposition 1 gram of a preparation of the hormone of the anterior lobe of the hypophysis has been suspended in 100 ccs. of paraffin-oil; but the suspension thus obtained has separated already after one hour. Therefore it is to be supposed that the wool fat has specific power to prevent the suspensions according to the present invention from separating.

As physiologically innocuous oils those of animal or vegetable origin come into consideration, as for instance, peanut-oil, sesame-oil and olive-oil. Such oils, however, have the disadvantage of being oxidized after a certain time and becoming rancid. It has been proved that this oxidation process unfavorably influences the stability of such suspensions.

It is another object of my invention to prevent this oxidation and consequently the decrease of stability caused thereby, by admixing oilsoluble substances capable of preventing oxidation with the suspensions obtained according to the process described. As substances to be added there come into consideration the usual substances preventing oxidation, especially such of phenolic character, for instance, hydroquinone, resorcinol, phenol and pyrogallol and also sulphydyrl compounds, such as cystein, thiophenol and thioglycollic acid. The quantity added may vary to a far reaching extent. Usually an addition of 0.2% of the substance preventing oxidation, calculated on the whole quantity of the suspension, is sufficient. Suitably a wool fat is employed which has been preliminarily purified, i. e. which is practically free from acids, such as is marketed under the name adeps lanae. Advantageously the addition of wool fat amounts to 5 to 15% calculated on the quantity of the oil employed. Solutions of the hormone of the anterior lobe of the hypophysis to which 10% of adeps lanae is added are especially suited.

It has proved that the preparations of the hormone of the anterior lobe of the hypophysis according to the present invention are extremely stable; for instance a suspension of the hormone in a mixture of lanoline and olive oil to which 0.2% of hydroquinone or resorcinol has been added has not lost its efficacy after some months' storage at room temperature.

The following examples illustrate the invention without being restricted thereto, the parts being by weight:

Example 1

5 parts of a crude product obtained from the urine of pregnant women by precipitation with alcohol are subjected to dialysis after having been extracted with alcohol of 50% strength with subsequent precipitation. From the inner liquid of the dialyzer a preparation of the hormone of the anterior lobe of the hypophysis is obtained which is substantially free from salts. This preparation is triturated with small quantities of a mixture of 10 parts of lanoline and 100 ccs. of olive oil. The suspension obtained does not separate in contradistinction to an oily suspension of the crude product of the hormone of the anterior lobe of the hypophysis to which the wool fat has been added. The preparation has no irritant effect and is more stable than an aqueous solution of the same starting material.

Example 2

10 parts of anhydrous lanoline and 0.2 parts of hydroquinone are dissolved in 100 parts of sesame oil while heating. After cooling this mixture is triturated with such a quantity of a preparation of the hormone of the anterior lobe of the hypophysis, that 1 cc. of the suspension obtained contains 100 rat-units. Depending on the purity of the preparation of the gonadotropic hormone employed 0.2–1.0 part is necessary for this purpose. The prepared suspension is stable and causes no irritation on injection.

Example 3

A suspension is prepared from 1 part of a highly purified preparation of the gonadotropic hormone of the anterior lobe of the hypophysis, which contains 100,000 rat-units in one part by weight, with 0.2 part of resorcinol, 10 parts of lanoline and 100 parts of olive oil. This suspension settles with difficulty, is stable and non-irritant and may be injected.

I claim:

1. A process of stabilizing and homogenizing a hormone preparation which comprises suspending a preparation of the gonadotropic hormone of the anterior lobe of the hypophysis in physiologically innocuous oil, said oil having an admixture of wool fat in an amount not exceeding 15% calculated on the quantity of oil employed.

2. A process of stabilizing and homogenizing a hormone preparation which comprises suspending a preparation of the gonadotropic hormone of the anterior lobe of the hypophysis in a physiologically innocous oil, said oil having an admixture of wool fat in an amount not exceeding 15% calculated on the quantity of oil employed, and of a fat-soluble anti-oxidant.

3. A process of stabilizing and homogenizing a hormone preparation which comprises suspending a preparation of the gonadotropic hormone of the anterior lobe of the hypophysis in physiologically innocuous oil, said oil having an admixture of wool fat in an amount of from 5–15% calculated on the quantity of oil employed.

4. A stable and homogeneous hormone suspension which comprises a preparation of the gonadotropic hormone of the anterior lobe of the hypophysis and a physiologically innocuous oil having an admixture of wool fat in an amount not exceeding 15% calculated on the quantity of oil employed.

5. A stable and homogeneous hormone suspension which comprises a preparation of the gonadotropic hormone of the anterior lobe of the hypophysis and olive oil having an admixture of wool fat in an amount not exceeding 15% calculated on the quantity of oil employed.

6. A stable and homogeneous hormone suspension which comprises a preparation of the gonadotropic hormone of the anterior lobe of the hypophysis and a physiologically innocuous oil having an admixture of wool fat in an amount of from 5–15% calculated on the quantity of oil employed.

7. A stable and homogeneous hormone suspension which comprises a preparation of the gonadotropic hormone of the anterior lobe of the hypophysis, and a physiologically innocuous oil having an admixture of wool fat in an amount not exceeding 15% calculated on the quantity of oil employed, and of fat-soluble anti-oxidant.

8. A stable and homogeneous hormone suspension in accordance with claim 7 in which the anti-oxidant is resorcinol.

HERMANN FRIEDRICH.